United States Patent [19]

Klein et al.

[11] 3,937,756

[45] Feb. 10, 1976

[54] FIRE RETARDANT POLYESTER RESINS

[75] Inventors: Howard Paul Klein; Harold George Waddill, both of Austin, Tex.

[73] Assignee: Jefferson Chemical Company, Inc., Houston, Tex.

[22] Filed: May 24, 1974

[21] Appl. No.: 473,000

[52] U.S. Cl. ........ 260/869; 260/75 H; 260/DIG. 24
[51] Int. Cl.² .................................... C08L 67/06
[58] Field of Search ... 260/75 H, 861, 869, DIG. 24

[56] References Cited
UNITED STATES PATENTS 3,697,625   10/1972   Smith et al.......................... 260/869

FOREIGN PATENTS OR APPLICATIONS 1,933,064   3/1971   Germany

Primary Examiner—Donald E. Czaja
Assistant Examiner—W. C. Danison, Jr.
Attorney, Agent, or Firm—James L. Bailey; John R. Kirk, Jr.

[57] ABSTRACT

A polymerizable fire retardant unsaturated polyester resin composition is prepared by reacting a dicarboxylic acid with a polyhydric compound and an effective amount of 4,5-dibromohexahydrophthalic anhydride or its corresponding acid. The resulting unsaturated polyester resin composition when mixed with a polymerizable monomer containing terminal unsaturation and cured exhibits improved flame resistance at low bromine concentrations.

13 Claims, No Drawings

FIRE RETARDANT POLYESTER RESINS

BACKGROUND OF THE INVENTION

1. Field of the Invention

This invention relates to polymerizable compositions of an unsaturated linear polyester. More particularly, the invention relates to polymerizable mixtures of unsaturated polyesters having improved fire retardant properties and the process of making such polyester compositions.

2. Description of the Prior Art

The production of infusible insoluble polyester resins which are flame-retardant and have a high resistance to heat is of considerable commercial importance. For instance, castings, moldings, and foamed articles on laminated structures bonded by polyester-type resins are, for many uses, desirably resistant to fire and/or are self-extinguishing. Structural members, such as pipes, wall coverings, panels, ash trays, etc. are further illustrations where flame-retardancy and/or self-extinguishing properties are desirable.

A number of flame-resistant unsaturated polyester resin compositions are known. One class of flame-resistant polyester resins contains Het acid (1,4,5,6,7,7-hexachlorobicyclo[2,2,1]-5-heptene-2,3-dicarboxylic acid) or its anhydride in the polyester composition. However, it is generally necessary to add phosphoric compounds in order to obtain the desired properties. Other flame-resistant polyester resin compositions contain fire retardant additives such as antimony trioxide or halogenated compounds such as halogenated hydrocarbons or halogenated phosphates, etc. These flame resistant polyester resins suffer from the disadvantage of producing products with a poor color stability. Still other fire resistant polyester resins have terminally located phosphonate groups built into the polyester structure as described, for example, in U.S. Pat. No. 3,150,208. Such polyester resins, however, are generally of poor stability and mediocre color.

Still other fire resistant unsaturated polyester resins contain bromine incorporated into the polyester molecule in an effective amount. For example, bromine is incorporated into an unsaturated polyester composition by direct bromination of a linear unsaturated polyester as disclosed, for example, in U.S. Pat. No. 3,536,782. However, such bromine-containing unsaturated polyesters are generally unacceptable in that high bromine concentrations are generally required in order to produce an effective level of fire retardancy.

Another class of bromine-containing unsaturated polyester resins of improved fire-retardance are those taught by U.S. Pat. No. 3,585,254 wherein the half-ester of 4-cyclohexene-1,2-dicarboxylic anhydride (tetrahydrophthalic anhydride) and a polyol is brominated and the resulting product is thereafter reacted with a dibasic acid, such as maleic anhydride to complete the esterification to form the bromine-containing unsaturated polyester resin. Such polyester resin compositions suffer from the disadvantages of involving multi-step processes in their manufacture and produce an unsaturated polyester with a very high bromine concentration; e.g., 18 wt. % and higher.

From the foregoing, it can be readily seen that many attempts to fire retard the unsaturated polyester resins have been made but have always left much to be desired.

It is therefore an object of this invention to develop a fire retardant unsaturated polyester resin which avoids the aforementioned problems. It is also an object of this invention to develop a process whereby said fire retarding and/or self-extinguishing properties are accomplished in a one-step process.

It is yet another object of this invention to develop a process for the preparation of a fire retardant unsaturated polyester resin composition which retains its color, clarity and stability and has superior fire extinguishing properties at low bromine concentrations.

Still further objects of the present invention will become apparent from the detailed description given hereinafter.

SUMMARY OF THE INVENTION

It has now been found that unsaturated polyester resins of superior flame resistance are produced by simultaneously mixing and reacting a polyhydric alcohol, an ethylenically unsaturated dicarboxylic acid or anhydride and an effective amount of 4,5-dibromohexahydrophthalic anhydride or its corresponding diacid. The resulting unsaturated polyester resins when mixed with a polymerizable monomer containing terminal ethylenic unsaturation and cured provide infusible resin compositions of improved flame resistance at remarkably low bromine concentrations.

DESCRIPTION OF THE PREFERRED EMBODIMENTS

In accordance with the instant invention, a polyhydric alcohol, an unsaturated dicarboxylic acid or its anhydride and 4,5-dibromohexahydrophthalic anhydride are esterified in a one-step process to produce novel bromine-containing unsaturated polyester resin of improved fire resistance.

The polyhydric alcohols which may be employed in the process of the instant invention include any of the polyhydric alcohols that are well-known in the production of polyester resins. Such polyhydric alcohols include the aliphatic glycols such as, for example, ethylene glycol, propylene glycol, butanediol-1,4; the glycol ethers such as diethylene glycol, dipropylene glycol and the like and higher functionality polyhydric materials such as glycerol and sorbitol. Also suitable are dihydric materials such as bisphenol-A and hydrogenated bisphenol-A. The preferred polyhydric alcohols are the aliphatic glycols having from 2 to 10 carbon atoms and the aliphatic glycol ethers having from 4 to 20 carbon atoms.

The ethylenically unsaturated dicarboxylic acids which are suitable in the process of the instant invention include, among others, maleic acid, fumaric acid, itaconic acid, etc. and the corresponding anhydrides of the cis-acids and mixtures thereof. These ethylenically unsaturated dicarboxylic acids may be employed alone or in conjunction with saturated dicarboxylic acids or dicarboxylic acids containing only benzenoid unsaturation. Included among such suitable acids are adipic acid, azeleic acid, sebacic acid, dimerized fatty acids, phthalic acid, isophthalic acid, terephthalic acid, etc. or mixtures thereof, as well as the anhydrides of those acids. These acids are generally employed in conjunction with the unsaturated dicarboxylic acid in order to modify the degree of unsaturation and thereby the reactivity of the resulting polyester resin. Whenever employed, the saturated dicarboxylic acids are generally present in a mole ratio to the unsaturated dicarboxylic acid of from about 10:1 to 1:10, with a preferred ratio being between about 5:1 and 1:5.

The 4,5-dibromohexahydrophthalic anhydride (also known as 4,5-dibromo-1,2-cyclohexanedicarboxylic anhydride) is an easy to handle light solid having a melting point of 137°–139° C. It is prepared from readily available starting materials as described in U.S. Pat. No. 2,550,744. In the process of the instant invention, it is equivalently useful to employ the corresponding diacid, 4,5-dibromohexahydrophthalic acid.

In the process of the instant invention, the polyhydric alcohol and the dicarboxylic acid (including the unsaturated dicarboxylic acid, the 4,5-dibromohexahydrophthalic acid and the saturated dicarboxylic acid, if present) are employed in a mole ratio such that there is approximately one hydroxyl equivalent per carboxyl equivalent. Thus, with a diol such as propylene glycol the mole ratio of the glycol to the dicarboxylic acids is approximately 1:1. Generally, however, there is present a slight excess of the polyhydric alcohol.

In the unsaturated polyester resin compositions of the instant invention, an effective level of fire retardancy is obtained whenever the 4,5-dibromohexahydrophthalic anhydride is employed in an amount of from about 5 to about 25 mole per cent of the total amount of dicarboxylic acid employed in the process of the instant invention with an amount of from about 10 to about 20 mole per cent being preferred. The resulting unsaturated polyester resin compositions when mixed with a polymerizable monomer containing terminal ethylenic unsaturation and cured into an infusible material exhibit excellent flame resistant at bromine concentrations of from approximately 2 to about 12 wt. %.

The esterification reaction of the instant invention is generally carried out at a temperature of from about 100°C. to about 200°C. with temperatures in the range of about 150°C. to 175°C. being preferred. The esterification should take place in a reaction vessel which is equipped with heating and cooling means, thermometer, agitator, means for providing an inert gas blanket under which to carry out the reaction, and means for removing the water of esterification.

The esterification reaction should preferably continue until the acid number of the reaction mixture has been reduced to 40 mg. of KOH per gram of mixture or less. A satisfactory product is obtained whenever the acid number of the resin composition is from about 0 to about 40 mg. KOH/g.

Although not essential, the esterification reaction is generally carried out in the presence of a solvent. Suitable solvents are generally those in which the dicarboxylic acids or acid anhydrides are at least partially soluble. Suitable solvents include, for example, aromatic solvents such as xylene, toluene and benzene. Whenever employed, the amount of solvent used is not critical and can vary widely. Amounts of solvent of from about 5% to about 90% by weight are satisfactory. For economic reasons, no more solvent should be employed than is necessary.

After the esterification reaction is completed, the solvent, if a solvent is employed, is removed from the reaction mixture. A suitable method involves stripping under vacuum.

To the resulting polyester resin is added an inhibitor in order to prevent premature gelation during manufacturing and storage. Such inhibitors and their dosages are well-known to those skilled in the art. For example, hydroquinone in an amount of approximately 0.01% by weight is satisfactory for this purpose. Other well-known inhibitors, such as quinone and tertiary butyl catechol, and the like, are also satisfactory.

The completed unsaturated fire-resistant polyester resin is then blended to the desired non-volatile concentration with an appropriate quantity of a polymerizable monomer which serves as a cross-linking agent in producing the infusible cured polyester. Typical polymerizable monomers including the vinyl monomers, such as styrene, vinyl toluene, diallyl phthalate, triethylcyanurate, diallyl maleate, diallyl fumarate, the isomers of dichlorostyrene, etc., and mixtures thereof. Also satisfactory are methyl methacrylate, ethyl methacrylate, methacrylate, ethyl acrylate, etc., and mixtures thereof. The preferred monomer, however, is styrene.

The bromine-containing unsaturated polyester resins of the instant invention are cured or polymerized into an infusible material by a free radical reaction by adding to the above-described resin composition a catalyst such as, for example, cumene hydroperoxide, tertiary butyl perbenzoate, tertiary butyl peroctoate, benzoyl peroxide, and the like. The resulting cured resin is a lightly colored material with excellent properties and a superior burn rate.

The invention is further illustrated, but not limited, by the following examples.

EXAMPLE I

To a 2 liter, 3-necked flask was added two moles (304 g.) of 4-cyclohexene-1,2-dicarboxylic anhydride and 1,200 ml. of acetic acid. The flask was placed in an ice bath and the contents (a partially soluble white slurry) were stirred and cooled to 10°–15°C. Then, 2 moles (320 g.) of bromine was added drop-wise over a 2 hour period. The resulting orange slurry was allowed to warm up to room temperature (25°C.) and stirred overnight. The final product slurry was removed by filtration, washed first with acetic acid, and then with normal heptane before drying in a vacuum oven. The resulting product was a white powdery solid with a melting point of 137°–139°C. The material was confirmed to be 4,5-dibromo-1,2-cyclohexanedicarboxylic anhydride (4,5-dibromohexahydrophthalic anhydride) and was obtained in a yield of 78%.

EXAMPLE II

To a one-half liter resin flask equipped with stirrer, thermometer, nitrogen inlet and Dean Stark trap filled with xylene were added maleic anhydride — 1 mole (98 g.); phthalic anhydride — 0.7 moles (103 g.); 4,5-dibromohexahydrophthalic anhydride — 0.3 moles (94 g.); propylene glycol — 2.2 moles (167 g.); and xylene — 25 ml. The reactants were heated with stirring to 155°–170°C. while water was removed. When the acid number of the reaction mixture was reduced to 40.0 mg. KOH per gram sample, the product was stripped under vacuum (5 mm. Hg) at 170°C. to remove the solvent. An inhibitor (hydroquinone — 0.01% by weight) was added to prevent premature gelation. When diluted with styrene (33% by weight), the resin contained 7.6% bromine. After curing, the resin was a lightly colored material with the following physical properties: Flexural strength, psi — 9770; Flexural modulus, psi $\times 10^{-5}$ —6.53; Heat deflection temperature, °C. at 264 psi — 84°; Burn rate (ASTM D757) — 0.1 in. per min.

After seven days' storage in an oven at 150°C., the resin exhibited the following properties: % weight loss — 2.7%; Flexural strength, psi — 10900; Flexural modulus, psi $\times 10^{-5}$ — 6.27.

Similarly prepared was a polyester resin from phthalic anhydride (1.7 moles; 252 g.); maleic anhydride (2.0 moles; 196 g.); tetrabromophthalic anhydride (0.3 moles; 140 g.); and propylene glycol (4.4 moles; 334 g.). After dilution with styrene (33%), the resin contained 7.6% bromine. When cured, the following properties were obtained: Flexural strength, 9920 psi; Flexural modulus, 6.61 psi $\times 10^{-5}$; heat deflection temperature at 264 psi, 86°C.; Burn rate (ASTM D757), 0.4 in. per min.

After seven days' storage in an oven at 150°C., the following properties were obtained: Weight loss, 2.8%; Flexural strength, 2480 psi; and Flexural modulus, 2.78 psi $\times 10^{-5}$.

What is claimed is:

1. A process for making a fire retardant infusible cured polyester bromine-containing resin comprising the steps of:
  initially forming a bromine containing polyester resin having ester groups derived from an ethylenically unsaturated dicarboxylic acid or acid anhydride in the polyester chain by simultaneously mixing and reacting
   a. polyhydric alcohol selected from the group consisting of aliphatic glycols having from 2 to 10 carbon atoms and aliphatic glycol ethers having from 4 to 20 carbon atoms;
   b. an ethylenically unsaturated dicarboxylic acid or acid anhydride selected from the group consisting of maleic acid, maleic anhydride, fumaric acid, itaconic acid, and mixtures thereof, and
   c. a 4,5-dibromohexahydrophthalic compound selected from 4,5-dibromohexahydrophthalic anhydride and 4,5-dibromohexahydrophthalic dicarboxylic acid at a temperature of from about 100°C to about 175°C to form a product having an acid number within the range of about 0 to 40 mg. KOH/g., wherein the dicarboxylic acid or anhydride (b) and the 4,5-dibromohexahydrophthalic compound (c) are collectively employed in an amount such that there is approximately one hydroxyl equivalent based on the polyhydric alcohol (a) per carboxyl equivalent and wherein the 4,5-dibromohexahydrophthalic compound (c) is present in an amount of from about 5 to about 25 mole percent of the total dicarboxylic acids (b) and (c);
  mixing the resulting polyester resin with a cross linking agent which is a polymerizable monomer having terminal ethylenic unsaturation; and,
  curing the resultant mixture to produce said fire retardant infusible cured polyester.

2. The process according to claim 1 wherein the polyhydric alcohol is selected from the group consisting of ethylene glycol, propylene glycol, diethylene glycol, dipropylene glycol, and mixtures thereof.

3. The process according to claim 2 wherein the ethylenically unsaturated dicarboxylic acid is selected from the group consisting of maleic acid, maleic anhydride, fumaric acid and mixtures thereof.

4. The process according to claim 3 wherein 4,5-dibromohexahydrophthalic anhydride is present in an amount of from about 10 to about 20 mole per cent of the total dicarboxylic acids (b) and (c).

5. The process according to claim 1 wherein the polymerizable monomer having terminal ethylenic unsaturation is selected from the group consisting of styrene, vinyl toluene, diallyl phthalate, triallyl cyanurate, triallylcitrate, diallylmaleate, diallylfumarate and mixtures thereof.

6. The process according to claim 5 wherein the polymerizable monomer having terminal ethylenic unsaturation is styrene.

7. A curable bromine-containing unsaturated polyester resin mixture consisting essentially of:
  a polymerizable monomer cross-linking agent having terminal ethylenic unsaturation; and,
  a polymerizable bromine-containing resin having ester groups derived from an ethylenically unsaturated dicarboxylic acid or acid anhydride in the polyester chain and being the reaction product of
   a. a polyhydric alcohol selected from the group consisting of aliphatic glycols having from 2 to 10 carbon atoms and aliphatic glycol ethers having from 4 to 20 carbon atoms;
   b. an ethylenically unsaturated dicarboxylic acid or acid anhydride selected from the group consisting of maleic acid, maleic anhydride, fumaric acid, itaconic acid and mixtures thereof, and
   c. a 4,5-dibromohexahydrophthalic compound selected from 4,5-dibromohexahydrophthalic anhydride and 4,5-dibromohexahydrophthalic dicarboxylic acid wherein the dicarboxylic acid or anhydride (b) and the 4,5-dibromohexahydrophthalic compound (c) are collectively employed in an amount such that there is approximately one hydroxyl equivalent based on the polyhydric alcohol (a) per carboxyl equivalent, wherein the 4,5-dibromohexahydrophthalic compound (c) is present in an amount of from about 5 to about 25 mole % of the total dicarboxylic acids (b) and (c) and wherein the reaction is accomplished at temperatures of 100°C to 175°C.

8. The composition of claim 7 wherein the polyhydric alcohol is selected from the group consisting of ethylene glycol, propylene glycol, diethylene glycol, dipropylene glycol and mixtures thereof.

9. The composition of claim 8 wherein the ethylenically unsaturated dicarboxylic acid is selected from the group consisting of maleic acid, maleic anhydride, fumaric acid and mixtures thereof.

10. The composition of claim 9 wherein the 4,5-dibromohexahydrophthalic anhydride is present in an amount of from about 10 to about 20 mole % of the total dicarboxylic acids (b) and (c).

11. The composition of claim 10 wherein the polymerizable monomer having terminal ethylenic unsaturation is selected from the group consisting of styrene, vinyl toluene, diallyl phthalate, triallyl cyanurate, triallylcitrate, diallylmaleate, diallylfumarate and mixtures thereof.

12. The composition of claim 11 wherein the polymerizable monomer having terminal ethylenic unsaturation is styrene.

13. The cured unsaturated polyester resin of the composition of claim 7.

\* \* \* \* \*